United States Patent
Mehtomaa et al.

(10) Patent No.: US 12,180,655 B2
(45) Date of Patent: Dec. 31, 2024

(54) MONITORING APPARATUS AND MONITORING METHOD

(71) Applicant: VALMET AUTOMATION OY, Espoo (FI)

(72) Inventors: Kimmo Mehtomaa, Espoo (FI); Kari Erkkilä, Espoo (FI); Juha-Matti Heinonen, Espoo (FI); Sami Kähkölä, Espoo (FI); Jukka Österholm, Espoo (FI)

(73) Assignee: VALMET AUTOMATION OY, Espoo (FI)

( * ) Notice: Subject to any disclaimer, the term of this patent is extended or adjusted under 35 U.S.C. 154(b) by 763 days.

(21) Appl. No.: 17/211,974

(22) Filed: Mar. 25, 2021

(65) Prior Publication Data

US 2021/0301466 A1 Sep. 30, 2021

(30) Foreign Application Priority Data

Mar. 26, 2020 (FI) .................................... 20205301

(51) Int. Cl.
*D21G 3/00* (2006.01)
*D21G 9/00* (2006.01)
(Continued)

(52) U.S. Cl.
CPC ........... *D21G 3/005* (2013.01); *D21G 9/0009* (2013.01); *G01H 17/00* (2013.01); *G01L 1/10* (2013.01)

(58) Field of Classification Search
USPC ..................................................... 427/428.14
See application file for complete search history.

(56) References Cited

U.S. PATENT DOCUMENTS

2004/0123965 A1* 7/2004 Isometsa .............. D21G 9/0036
162/263
2018/0100271 A1 4/2018 Edbauer et al.
(Continued)

FOREIGN PATENT DOCUMENTS

CA 1320757 C 7/1993
EP 0578427 A2 1/1994
(Continued)

OTHER PUBLICATIONS

Oct. 7, 2020 Search Report issued in Finnish Patent Application No. 20205301.
(Continued)

*Primary Examiner* — Michael P. Rodriguez
(74) *Attorney, Agent, or Firm* — Oliff PLC (57) ABSTRACT

A monitoring apparatus for a doctoring comprises a vibration sensor which is individual and is attached at a discrete location of a doctor blade arrangement, the at least one vibration sensor converting a mechanical vibration of the doctor blade arrangement to an electrical signal, the mechanical vibration being caused by the doctor blade in response to a scraping operation of a rotating roll which is in contact with a moving web. A data processing unit receives the electrical signal carrying information on the vibration, compares said vibration with a reference of at least one previous measurement of a same grade of the web, and start one or more preventive actions in order to avoid a drop-through in the case said vibration exceeds at least one boundary of the reference.

16 Claims, 3 Drawing Sheets

(51) Int. Cl.
    *G01H 17/00*     (2006.01)
    *G01L 1/10*     (2006.01)

(56) References Cited

U.S. PATENT DOCUMENTS

| | | |
|---|---|---|
| 2018/0171557 A1 | 6/2018 | Autio et al. |
| 2019/0120811 A1 | 4/2019 | Luneau et al. |
| 2019/0193946 A1* | 6/2019 | DeVries ................ G01M 13/00 |

FOREIGN PATENT DOCUMENTS

| | | |
|---|---|---|
| EP | 0989234 B1 | 4/2004 |
| EP | 1244850 B1 | 5/2007 |
| EP | 2769017 B1 | 7/2017 |
| FI | 115237 B | 3/2005 |
| FI | 20050091 A | 7/2006 |
| WO | 02/084023 A1 | 10/2002 |
| WO | 2012/013857 A1 | 2/2012 |
| WO | 2013/059055 A1 | 4/2013 |
| WO | 2016/203109 A1 | 12/2016 |
| WO | 2019/084144 A1 | 5/2019 |

OTHER PUBLICATIONS

Finnish Patent Application No. 20155470 filed Jun. 17, 2015.
Jul. 23, 2021 Search Report issued in European Patent Application No. 21164206.1.

\* cited by examiner

MONITORING APPARATUS AND MONITORING METHOD

FIELD

The invention relates to a monitoring apparatus and a monitoring method relating to doctoring.

BACKGROUND

A challenging problem of a doctor blade arrangement of a fiber web machine such as a paper machine is its malfunction, and at present malfunctions are not noticed early enough. A malfunction i.e. a drop-through quickly results in a great damage to the roll, which is scraped by the doctor blade, and to the doctor blade and its support beam because a large amount of fiber web material is rapidly heaped up thereon. A grade change additionally increases the challenge how to cope with a possibility of the drop-through.

Many kinds of sensor devices have been proposed for detecting the drop-through. For example, attempts have been made to determine a deformation of the doctor blade when the drop-through takes place. However, all sensor systems fail to detect the drop-through early enough to avoid the damages to the fiber web machine. Hence, there is a need to improve the detections.

BRIEF DESCRIPTION

The present invention seeks to provide an improvement in monitoring the doctoring.

The invention is defined by the independent claims. Embodiments are defined in the dependent claims.

LIST OF DRAWINGS

Example embodiments of the present invention are described below, by way of example only, with reference to the accompanying drawings, in which.

DESCRIPTION OF EMBODIMENTS

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may also contain features/structures that have not been specifically mentioned. All combinations of the embodiments are considered possible if their combination does not lead to structural or logical contradiction.

It should be noted that while Figures illustrate various embodiments, they are simplified diagrams that only show some structures and/or functional entities. The connections shown in the Figures may refer to logical or physical connections. It is apparent to a person skilled in the art that the described apparatus may also comprise other functions and structures than those described in Figures and text. It should be appreciated that details of some functions, structures, and the signalling used for measurement and/or controlling are irrelevant to the actual invention. Therefore, they need not be discussed in more detail here.

Figure 1A:
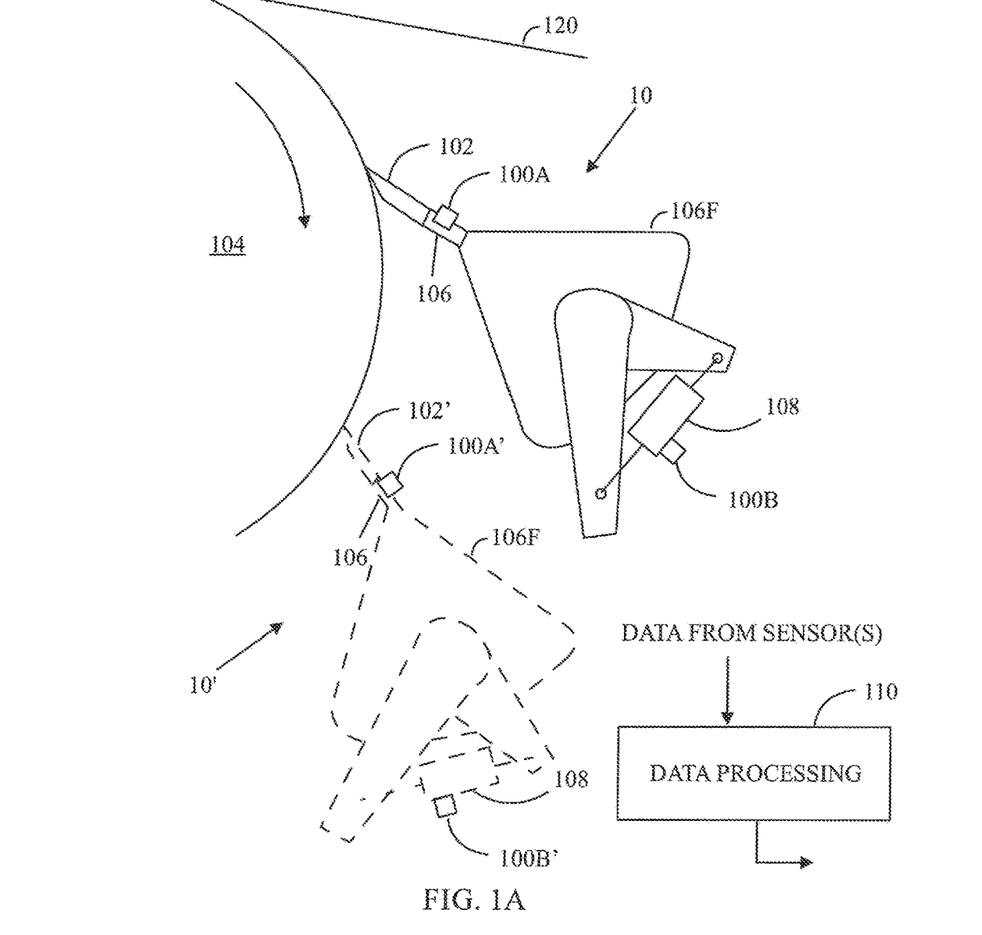
FIG. 1A illustrates an example of a rotating roll with two doctor blade arrangements from side.

FIG. 1A illustrates an example of two doctor blade arrangements 10, 10' from the side. Examine now a first 10 of the doctor blade arrangements. Some material of a web 120, which travels on the rotating roll 104, may adhere to the rotating roll 104, and a doctor blade 102 scrapes or wipes the rotating roll 104 clean. Alternatively, the doctor blade 102 may be used to doctor a belt such as a wire. The rotating roll 104, belt or wire may belong to a paper, board or pulp machine, for example. Thus, the doctor blade 102 removes material from the moving surface against which it is pressed.

When the removal of the material from the surface of the rotating roll 104 succeeds, the surface is clean behind the doctor blade 102 in a direction of the movement, and the removed material may be collected for reuse, for example. The material that is removed from the moving surface such as the roll 104 may be substance or matter that is used in the manufacturing process of an end product such as paper, cardboard or some other kind sheet. Removed material of a paper web may be dropped in a pulper, for example. In an embodiment, the rotating roll 104 may be a center roll of a paper machine, for example.

If a drop-through, which is a serious malfunction condition, cannot be prevented beforehand and it really happens, it means the doctor blade 102, 102' does not clean the rotating roll 104 properly or at all. Such a malfunction is a serious condition, which can deform and/or break the rotation roll 104 as the web 102 is quickly forms a thick layer on the rotating roll 104. Also any other process structures near the rotating roll 104 may be harmed. Repairing the damage is expensive.

The doctor blade 102 may be made of hard solid material. The doctor blade 102 may be made of plastic, carbon fiber, steel, or the like for example. The doctor blade 102 wears in use (applies also to doctor blade 102').

The doctor blade 102 is attached with a support 106, which is attached or a part of a frame structure 106F. The support 106 may have jaws between which the doctor blade 102 is pinched (this kind of attachment is not shown in Figures). However, the manner how the doctor blade 102 is attached with the support 106 is not limited to the jaws and pinch. A pressure cylinder 108 in the frame structure 106F may be used to adjust a position of the doctor blade 102, 102'. FIG. 1 and this document do not describe the operation of the pressure cylinder 108 in detail because its operation, per se, is known by a person skilled in the art. A second of the doctor blade arrangements 10' is similar to the first of the doctor blade arrangements 10.

Figure 2:
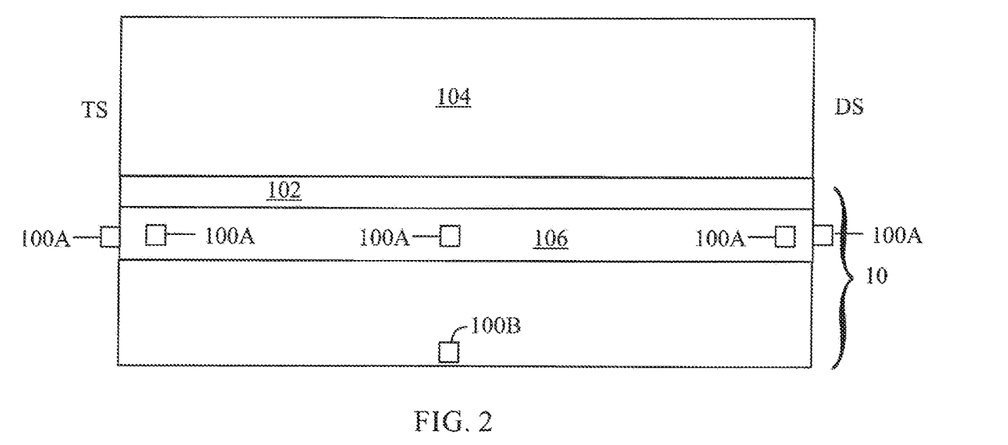
FIG. 2 illustrates an example of a rotating roll with two doctor blade arrangements from top.

FIG. 2 illustrates the example of the doctor blade arrangements of FIG. 1 from the top.

A sensor apparatus for a doctor blade arrangement 10, 10', an example of which is illustrated in FIGS. 1 and 2, comprises at least one vibration sensor 100A, 100A', 100B, 100B'. The electrical signal of the at least one vibration sensor 100A, 100A', 100B, 100B' carrying information on the mechanical vibration allows comparison of said vibration with a reference of at least one previous measurement of a same grade of the web 120. The previous measurement may refer to a running average of the vibration of the web right before a present measurement, for example. In an embodiment, the running average may be cover the vibration of the web within about 3 s to about 30 s, for example. In an embodiment, the running average may be cover the vibration of the web within 10 s, for example. A data processing unit 110 can then start one or more preventive actions in order to avoid a drop-through in the case said vibration exceeds at least one boundary of the reference.

The electrical signal of the at least one vibration sensor 100A, 100A', 100B, 100B' carrying information on the mechanical vibration also allows a prediction of the drop-through before it actually happens.

The mechanical vibration namely has one or more characteristic features before the drop-through. The mechanical vibration can be understood to be mechanical oscillating movement. The characteristic features may be learnt during monitoring the doctor blade arrangement 10, 10' in a test use and/or in an actual operation.

In an embodiment, the sensor apparatus comprises a support 106 of the doctor blade 102, 102' as a part of the doctor blade arrangement 10, 10', and the support 106 may comprise at least one of the at least one vibration sensor 100A, 100A'. The attachment may be based on, for example, one or more of the following: glue, screws, insertion/embedding in a tight hole without limiting to these. In an embodiment, the at least one vibration sensor 100A, 100A' comprises an acceleration sensor. In an embodiment, the at least one vibration sensor 100A, 100A' may comprise an accelerometer a of micro-machined microelectromechanical system (MEMS), for example. In an embodiment, the at least one vibration sensor 100A, 100A' may be based on piezoelectric, piezoresistive and/or capacitive property, for example. In an embodiment, the at least one vibration sensor 100A, 100A' may utilize an optical radiation source, a fiber Bragg grating and an optical detector. The pressure variation makes also the optical radiation to vary accordingly.

In an embodiment, the at least one vibration sensor 100B, 100B' may comprise an acceleration sensor. In an embodiment, the at least one vibration sensor 100B, 100B' may comprise an accelerometer of a micro-machined microelectromechanical system (MEMS), for example. In an embodiment, the at least one vibration sensor 100B, 100B' may be based on a piezoelectric, piezoresistive and/or capacitive property, for example.

The at least one vibration sensor 100B and 100B' may be attached with the pressure cylinder 108. The at least one vibration sensor 100B, 100B' may be within the pressure cylinder 108, included in an oil chamber or in connection with the actual pressure cylinder 108. The pressure variation of the oil may cause the vibration sensor 100B, 100B' to mechanically vibrate. Instead of oil, also other kind on liquid may be used in the pressure cylinder 108 based on a hydraulic operation. The at least one vibration sensor 100B and 100B' may be attached using, for example, one or more of the following: glue, screws, insertion/embedding in a tight hole without limiting to these.

In an embodiment, the at least one vibration sensor 100B and 100B' may comprise a pressure sensor. The pressure sensor may be based on piezoelectric, piezoresistive and/or capacitive property, for example.

Figure 1B:
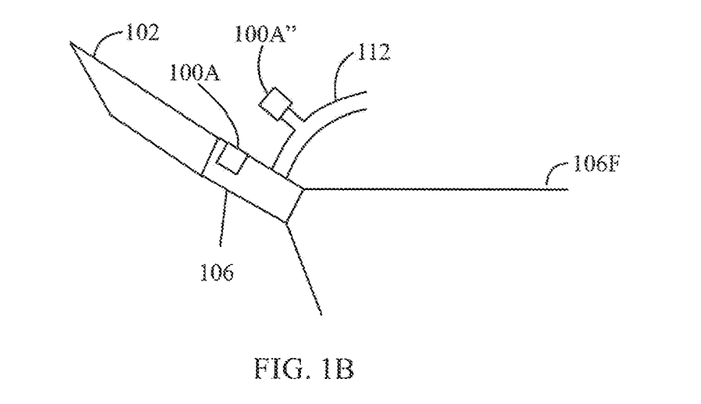
FIG. 1B illustrates an example a pressure measurement from a tube of the doctor blade.

FIG. 1B illustrates an example of an embodiment where a vibration sensor 100A" is a pressure sensor, which is used to measure a pressure in a hose 112 connected to the support 106. The vibration of the doctor blade 102 causes pressure variation to a fluid in the hose 112, and the pressure variation may be sensed by the pressure sensor 100A". The fluid, which may comprise liquid and/or gas, and the hose 112 may be used to cause a contact force (pinch) to the doctor blade 102 or a pressure of the doctor blade 102 against the roll 104. However, the pressure variation in the hose 112 may be measured irrespective of the use of the fluid and the tube 112. The contact force of the doctor blade 102, 102' against the surface of the roll 104 may additionally or alternatively be provided by gravity. All in all, the at least one vibration sensor 100A, 100A', 100B, 100B' may perform a mechano-electrical conversion.

In an embodiment an example of which can be seen in FIG. 2, one of the at least one vibration sensor 100A, 100A', 100B, 100B' is located at at least one of the following locations: a tending side TS of the doctor blade arrangement 10, 10' and a drive side DS of the doctor blade arrangement 10, 10'. When a vibrational sensor 100A, 100A' is attached with the support 106, it can be located at either of the tending side TS or the drive side DS of the support 106. The paper machine or a corresponding machine is controlled from the tending side, and the drive side is the opposite side of the machine.

Each of the at least one vibration sensor 100A, 100A', 100B, 100B' may be individual. That the at least one vibration sensor 100A, 100A', 100B, 100B' is individual may be understood in an operational and structural manner such that each of the at least one vibration sensor 100A, 100A', 100B, 100B' is a compact single structure. In a case of a plurality of the vibration sensors 100A, 100A', 100B, 100B', their operation does additionally not require a structural connection therebetween. These kinds of features allow each of the at least one vibration sensor 100A, 100A', 100B, 100B' to be attached at a discrete location of the doctor blade arrangement 10, 10'. The at least one vibration sensor 100A, 100A', 100B, 100B' then converts a mechanical vibration of the doctor blade arrangement 10, 10' to an electrical signal. Each electrical signal may depend on a location at the doctor blade arrangement 10, 10'. The vibration is caused by a doctor blade 102, 102' in response to a scraping operation of a rotating roll 104. The moving web 120, which may be a paper web, is in contact with the rotation roll 104.

The at least one vibration sensors 100A, 100A', 100B, 100B' outputs the electrical signal carrying information on the vibration and a data processing unit 110 receives the electrical signal of the information on the vibration. Then the data processing unit 110 compares said vibration with a reference of at least one previous measurement of a same grade of the web 120, and starts one or more preventive actions in order to avoid a drop-through in the case said vibration exceeds at least one boundary of the reference. The reference may be a reference vibration and/or its at least one boundary.

In an embodiment, the data processing unit 110 starts one or more preventive actions in order to avoid a drop-through in the case said vibration exceeds all boundaries of a plurality of boundaries of the reference. The comparison with the same grade of the web 120 automatically adjusts with a grade change, for example. The at least one boundary may refer to a predetermined boundary or a maximum value of the reference.

The information on the vibration in that manner allows for a prediction of the drop-through on the basis of the information in the case the information includes characteristics of the drop-though. The prediction of a drop-through or a non-drop-through on the basis of the information on the vibration is also possible.

In the case the drop-through is going to happen according to the exceeding and/or the prediction, one or more preventive actions against the drop-through may be performed in response to the exceeding and/or the prediction of the drop-through. The drop-through may also be called a doctor passing.

The one or more characteristic features for the at least one boundary may be detected in or as a frequency of the vibration, a frequency variation of the vibration, a frequency shift of the vibration, an effective value of the vibration, and/or one or more peak values of the vibration with respect to a corresponding reference. The effective value of the vibration may refer to a root mean square value of the vibration, for example. The reference may depend on the web 120, the rotating roll 104, the doctor blade arrangement 10, 10' and a location of the at least one vibration sensor 102A, 102A', 102B, 102B', and the reference may be defined and/or measured before the actual operation in a manufacturing process. The reference may be based on process variables.

In an embodiment, the reference includes a running average of vibration of the web 120 within a period directly prior to a present measurement. In an embodiment, the reference includes a running average of vibration of the same grade web 120 within a period prior to a present measurement. In an embodiment, the reference includes a running average of vibration of a web similar or of the same grade to the web 120 under measurement, the running average of vibration being formed within a period prior to a present measurement. The running average automatically adjusts with a grade change, for example.

The reference may be based on a normal operation of the doctor blade arrangement 10, 10' when the doctor blade 102, 102' scrapes the surface of the rotating roll 104 or the like without a drop-through. Then an amplitude of the vibration signal from the at least one vibration sensor 102A, 102A', 102B, 102B' may include noise or a variation, which resembles noise. An amplitude of the signal from the at least one vibration sensor 102A, 102A', 102B, 102B' may additionally or alternatively include a deterministic variation. However, during a normal operation an effective variation or a power of the vibration is at or below a certain limit, and the certain limit may be used as a reference. Correspondingly, an amplitude distribution as a function of frequency or a power distribution as a function of frequency may be measured during a normal operation without a drop-through. The amplitude or power distribution may have a variation which is within a certain range, and that variation may be used as a reference.

In an embodiment, the reference may be unique for a single pair of the rotating roll 104 and the doctor blade arrangement 10, 10'. In an embodiment, the reference may be common to all pairs of the rotating roll 104 and the doctor blade arrangement 10, 10' of a single section of a manufacturing machine of an end product such as a paper machine or the like. In an embodiment, the reference may be common to all pairs of the rotating roll 104 and the doctor blade arrangement 10, 10' of a whole manufacturing machine of an end product such as a paper machine or the like.

A monitoring apparatus for a doctor blade arrangement 10, 10' comprises the sensor apparatus with the at least one vibration sensor 100A, 100A', 100B, 100B' and a data processing unit 110, which receives the electrical signal carrying information on the vibration. Then the data processing unit 110 starts automatically one or more preventive actions in order to avoid a drop-through in the case said vibration exceeds at least one boundary of the reference. The drop through may also be predicted based on a deviation between the information on the vibration and a reference.

In an embodiment, the reference defines at least one boundary or limit of a value of the mechanical vibration carried by or derivable from the information that the mechanical variation may not cross in order to avoid the drop-through and/or its prediction. That means that in a case the data processing unit 110 detects that a value of the mechanical vibration carried by or derivable from the information exceeds the limit, the data processing unit 110 starts automatically the one or more preventive actions against the drop-through that may also be predicted.

In an embodiment, the reference defines a range within which a value of the mechanical vibration carried by or derivable from the information should remain in order to avoid the drop-through and/or the prediction thereof. That means that in a case the data processing unit 110 detects that a value of the mechanical vibration carried by or derivable from the information is outside the at least one boundary, the data processing unit 110 automatically starts the one or more preventive actions to avoid the drop-through. The range within the at least one boundary may be continuous or a discrete. The discrete range may comprise two extreme sub-ranges separate from each other and potentially one or more sub-ranges therebetween.

Figure 3:
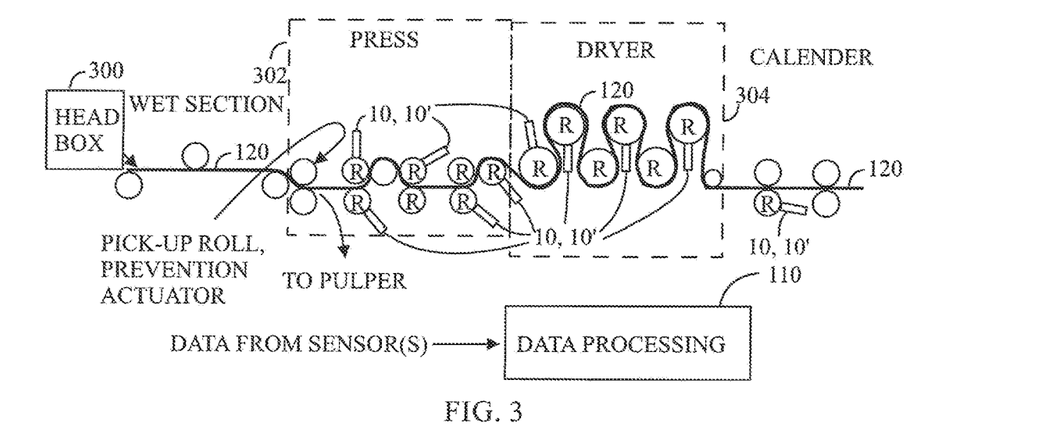
FIG. 3 illustrates an example of a paper machine.

Examine now a process where the above described doctor blade arrangement 10, 10' may be applied. FIG. 3 shows an example of a paper machine. From the headbox 300 stock is fed through a slice opening of the headbox 300 to a former of a wet section. In the former, water is drained out of the web 120 which is on a wire i.e. a continuous belt. The web 120 is preliminarily dried and pressed in a press 302. The web 120 is further dried in a dryer section 304.

The paper machine, which in connection with this application refers to paper or board machines, may also include a calender section 306, where the web 120 runs between the rolls pressing with desired force.

The paper machine may have a coating section and/or a finishing section (not shown in Figures) before or after the calender section 306. However, the paper machine and a coating machine may be separate machines, too.

In addition to this, it is clear that the operation of the paper machine and/or the coating machine is known, per se, to a person skilled in the art, and therefore, it need not be presented in greater detail in this context.

The press section 302, the dryer section 304, the calender section 306, the coating section and/or the finishing section may have at least one roll R similar to the rotating roll 104 with a doctor blade arrangement 10, 10', and the drop-through associated with the at least one roll R similar to the rotating roll 104 with a doctor blade arrangement 10, 10' may be predicted with the data processing unit 110. The rolls marked with R are only examples of possibilities where the at least one vibration sensor 102, 102' may be applied. FIG. 3 also shows a pick-up roll which may be used for picking up the web 120, and breaking the web 120 when the data processing unit 110 predicts a drop-through is about to take place.

In an embodiment an example of which is illustrated in FIG. 3, the data processing unit 110 may control a pick-up roll of the paper machine to raise in order to break the web 120 before the rotating roll 104 (such are center roll) in the machine direction such that no web 120 can wrap around the rotating roll 104 when the drop-through is predicted. Then the moving web 120 will be run down to a pulper for example.

In an embodiment, the data processing unit 110 may monitor electric signal carrying information on the mechanical vibration when the web 120 is picked up with the pick-up roll (see FIG. 3). When the web 120 is picked up, a front end of the web 120 is transferred to the rotating roll 104 which has the at least one doctor blade arrangement 10, 10'. The front end of the web 120 may have a full width, which covers the rotating roll 104 at least almost fully, or the front end of the web 120 may be narrower than the full width of the web 120. That is, the front end may refer to a front edge. When a tail threading is performed, a tail end of the web 120 may be used. After that the web 120 may be widened.

When the front end of the web 120 reaches the rotating roll 104, the blade 102, 102' may receive a mechanical impact from material that remains on the surface of the rotating roll 104. Depending on the parameters of the impact that are detected by the at least one vibrational sensor 100A, 100A', 100B, 100B' and measured by the data processing unit 110, the data processing unit 110 either starts the one or more preventive actions or allows the feed of the web 120 to continue to the rotating roll 104.

During the pick-up, the front edge comes to contact with a doctor blade 102, a first doctor blade if there are more than one one after another, and the front edge is conveyed forward. When the front edge ends and full wide web comes to the roll 104, the web loses contact with the doctor blade 102 or at least that should take place in order to avoid a drop-through.

In an embodiment, the data processing unit 110 may disable a feed of the web 120 to the rotating roll 104 when the vibration exceeds at least one boundary of the reference in order to avoid the drop-through. In an embodiment, the data processing unit 110 may control a prevention actuator to disable a feed of the web 120 to the rotating roll 104, the prevention actuator locating before the rotating roll 104 in a machine direction. In an embodiment, the prevention actuator may be the pick-up roll (see FIG. 3) without limiting to it.

In an embodiment, the data processing unit 110 may control the pick-up roll such that the vacuum is released from the pick-up roll when the drop-through is predicted, which may improve an efficiency of the preventive actions.

In an embodiment, the data processing unit 110 may control the pick-up roll such that an excess pressure is applied to the pick-up roll when the drop-through is predicted, which may further improve the efficiency of the preventive actions.

In an embodiment, the data processing unit 110 may control a nip load of the rotating roll 104 such that the nip load is lightened or removed when the drop-through is predicted, which decreases a probability to damages to the doctor blade arrangement 10, 10', for example.

In an embodiment, characteristics for a vibration sensor 100A at one location in the doctor blade arrangement 10, 10' may be independent from characteristics for a vibration sensor 100A at at least one other location of the doctor blade arrangement 10, 10'. In an embodiment, characteristics for a vibration sensor 100A at one location in the doctor blade arrangement 10, 10' may be different from characteristics for a vibration sensor 100A at at least one other location of the doctor blade arrangement 10, 10'.

In an embodiment, a range of the reference for a vibration sensor 100A at one location in the doctor blade arrangement 10, 10' may be independent from a range of the reference for a vibration sensor 100A at at least one other location of the doctor blade arrangement 10, 10'. In an embodiment, the range and/or the at least one boundary of the reference for a vibration sensor 100A at one location in the doctor blade arrangement 10, 10' may be different from a range and/or at least one boundary of the reference for a vibration sensor 100A at at least one other location of the doctor blade arrangement 10, 10'.

In an embodiment, the range and/or the at least one boundary of the reference for the vibration sensor 100A at one location in the doctor blade arrangement 10, 10' may be different from a range and/or at least one boundary of a reference for a vibration sensor 100A at any other location of the doctor blade arrangement 10, 10'.

In an embodiment, a range of a reference for a vibration sensor 100A at the tending side TS and a range of a reference for a vibration sensor 100A at the drive side DS may be independent from each other. In an embodiment, the range and/or at least one boundary of the reference for the vibration sensor 100A at the tending side TS and the range and/or at least one boundary of the reference for the vibration sensor 100A at the drive side DS may be different from each other.

Any of these location-specific measurements allows an effective detection of a possibility of a coming drop-through, because the mechanical vibration may be different at different locations and the drop-through may be about to begin at a certain location without involving a full width of the rotating roll 104 and/or the moving web 120.

In an embodiment, the data processing unit 110 may determine at least one of the following parameters: a frequency of the vibration, a frequency variation of the vibration, a frequency shift of the vibration, an effective value of the vibration, and one or more peak values of the vibration. The data processing unit 110 may then detect a deviation of any one of said parameters from the reference. The data processing unit 110 may, as a result, start the one or more preventive actions in response to the detection of the deviation.

The effective value in general may refer to power of the vibration or a root mean square value or the like, for example.

In an embodiment, any of the at least one parameter may have a corresponding reference. That is, if the data processing unit 110 detects that the frequency of the mechanical vibration exceeds the limit or resides outside the range determined in the reference dedicated to said frequency, the data processing unit 110 starts the at least one preventive action. In general, the at least one parameter may depend on 1) the grade of the web 120 2) a location of the vibration sensor 100A, 100A', 100B, 100B' in the doctor blade arrangement 10, 10', 3) a type of parameter (frequency, frequency variation, frequency shift, effective value, peak), and 4) the doctor blade 102, 102', which the vibration sensor 100A, 100A', 100B, 100B' is associated with. Correspondingly, the reference, which the measured parameter is compared with, also depends on 1) the grade of the web 120, 2) a location of the vibration sensor 100A, 100A', 100B, 100B' in the doctor blade arrangement 10, 10', 3) a type of parameter (frequency, frequency variation, frequency shift, effective value, peak), and 4) the doctor blade 102, 102', which the vibration sensor 100A, 100A', 100B, 100B' is associated with. The data processing unit 110 makes the comparison using the same locations and types for the reference and the values of or derived from the received information.

In an embodiment, a reference of a second doctor blade arrangement 10', which is behind a first doctor blade arrangement 10 in a machine direction, may be different from a reference of the first doctor blade arrangement 10. For example, a reference of the effective value of the second doctor blade arrangement 10' may be lower than that of the first doctor blade arrangement 10. In a similar manner, a reference of the peak value of the second doctor blade arrangement 10' may be lower than that of the first doctor blade arrangement 10, for example. Because the rotating roll 104 should be clean behind the doctor blade 102 of the first doctor blade arrangement 10, the doctor blade 102' of the second doctor blade arrangement 10' should not receive impacts caused by material adhered to the surface of the rotating roll 104. If that happens, a drop-through may be about to occur. When the drop-through happens to a doctor blade 102 of the first doctor blade arrangement 10, a frequency, a frequency variation and/or a frequency shift may be caused to the doctor blade 102' of the second doctor blade arrangement 10'.

Figure 4:
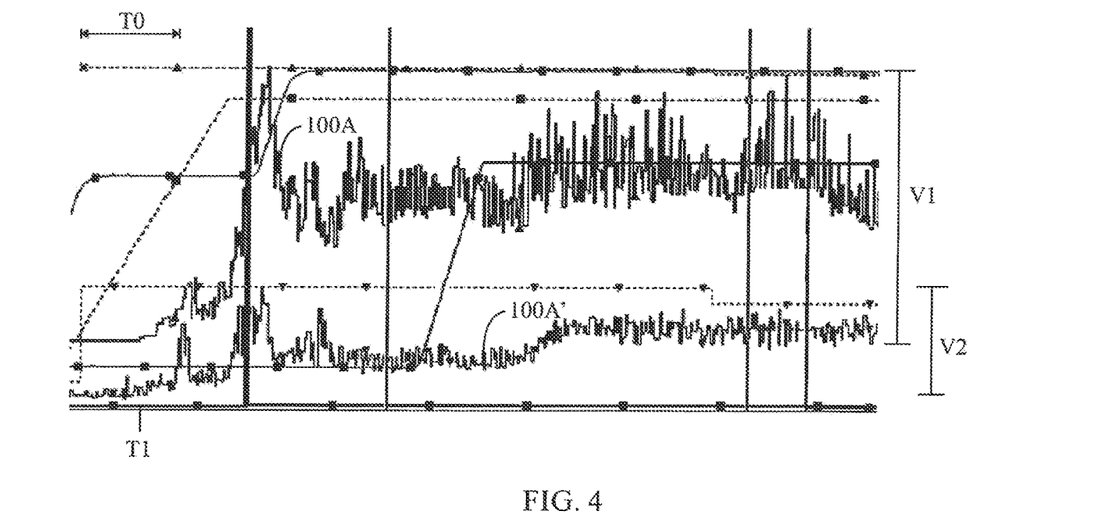
FIG. 4 illustrates an example of rms-curves of mechanical vibration related to two doctor blades on after another in a machine direction.

In an embodiment an example rms-vibration signals of vibration sensors 100A, 100A' are shown in (rms=root mean square). The rms-value may be computed within a predetermined period. In an embodiment, the duration of the period may be selected from a range from about 0.1 s to about 10 s, for example. In an embodiment, the duration of the period may be about 1 s, for example. That is, the rms-value may be computed repeatedly at least approximately every 0.1 s to 10 s. In an embodiment, the frequency range of the variation included in the rms-variation may within a band from about 1 Hz to about 10 kHz, for example. In an embodiment, the frequency range of the variation included in the rms-variation may within a band from about 3 Hz to about 1 kHz, for example, without limiting to these values.

V1 denotes an rms-variation range of the vibration of a first blade 102 in the machine direction. V2 denotes an rms-variation range of the vibration of a second blade 102' in the machine direction. Both are in an acceptable range i.e. within a reference in this example, and they do not cause preventive actions.

The data processing unit 110 may perform the monitoring starting at a beginning T0 of a feed of a front end of the web 120 to the rotating roll 104. The moment T0 may be somewhere in a line marked with T0. The data processing unit 110 may be triggered to allow preventive actions in response to the beginning of the feed of the front end of the web 120 to the rotating roll 104. The feed of the front end of the web 120 from a pick-up roll or the like to the rotating roll 104 start a few seconds before a moment T1 the front end of the web 120 arrives at the rotating roll 104, for example. The data processing unit 110 may be triggered to allow preventive actions in response to a moment when the pick-up roll guides the web 120 towards the rotating roll 104.

In an embodiment, the data processing unit 110 may perform the monitoring in time window a duration of which is less than about 15 min. The window may start at a beginning of the feed of the front end of the web 120 to the rotating roll 104.

In an embodiment, the data processing unit 110 may adapt the at least one boundary of the reference on the basis of a plurality of occurred drop-throughs. In an embodiment, the data processing unit 110 may store the data on the plurality of drop-throughs for using the data to adapt the reference for coming drop-throughs.

In an embodiment, the data processing unit 110 may adapt the reference depending on a location of a vibration sensor 100A, 100A', 100B, 100B' in the doctor blade arrangement 10, 10' and/or the type of the parameter on the basis of a plurality of occurred drop-throughs. In this manner, the reference can be adapted such that the number of the drop-throughs decrease. The decrease of the drop-throughs may result in no drop-through at all.

In an embodiment, the data processing unit 110 may perform the monitoring in time window a duration of which starts at the beginning T0 of the feed of the front end of the web 120 to the rotating roll 104. The data processing unit 110 may end the monitoring at a moment of stabilization of the mechanical vibration. The data processing unit 110 may determine the stabilization from the electrical signal carrying information on the vibration. The data processing unit 110 may determine the stabilization when the amplitude or power the variation of the mechanical vibration is within a predetermined range and/or at a predetermined level.

Figure 5:
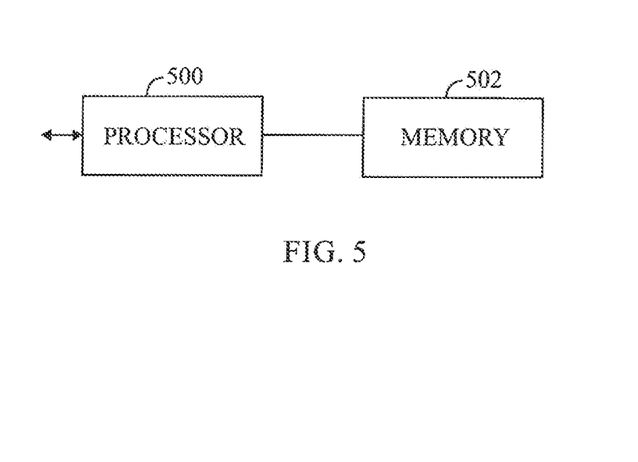
FIG. 5 illustrates an example of a data processing unit.

In an embodiment an example of which is illustrated in FIG. 5, data processing unit 110 comprises one or more processors 500, and one or more memories 502, which may include a computer program code. The one or more memories 502 and the computer program code are configured to, with the one or more processors 500, cause data processing unit 110 to receive the electrical signal from the at least one vibration sensor 100A, 100A', 100B, 100B', compare said vibration with a reference of at least one previous measurement of a same grade of the web 120, and start one or more preventive actions in order to avoid a drop-through in the case said vibration exceeds at least one boundary of the reference as already explained earlier.

In an embodiment, because the doctor blade 102, 102' wears during use its mechanical vibration alters, and a doctor blade 102, 102' that needs to be replaced with a new one has a characteristic vibration, which may exceed the at least one boundary of the reference. The data processing unit 110 may determine if a doctor blade 102, 102' is worn and needs to be replaced on the basis of the information on the vibration if the information includes characteristics of a worn doctor blade 102, 102'. A worn doctor blade 102, 102' may have larger amplitude variation than a new doctor blade. A worn doctor blade 102, 102' may generate one or more different frequencies than a new doctor blade. During the use, one or more parameter of the mechanical vibration of a doctor blade 102, 102' may alter as a function of time, and when the deviation from a reference, which may be defined at the beginning of the use, is larger than a threshold, the data processing unit 110 may provide information to the user that the doctor blade requires a replacement. The data processing unit 110 may comprise or may be connected to a user interface which may be used to inform the user about the replacement. The user interface may include a display and/or a loudspeaker, for example.

Figure 6:
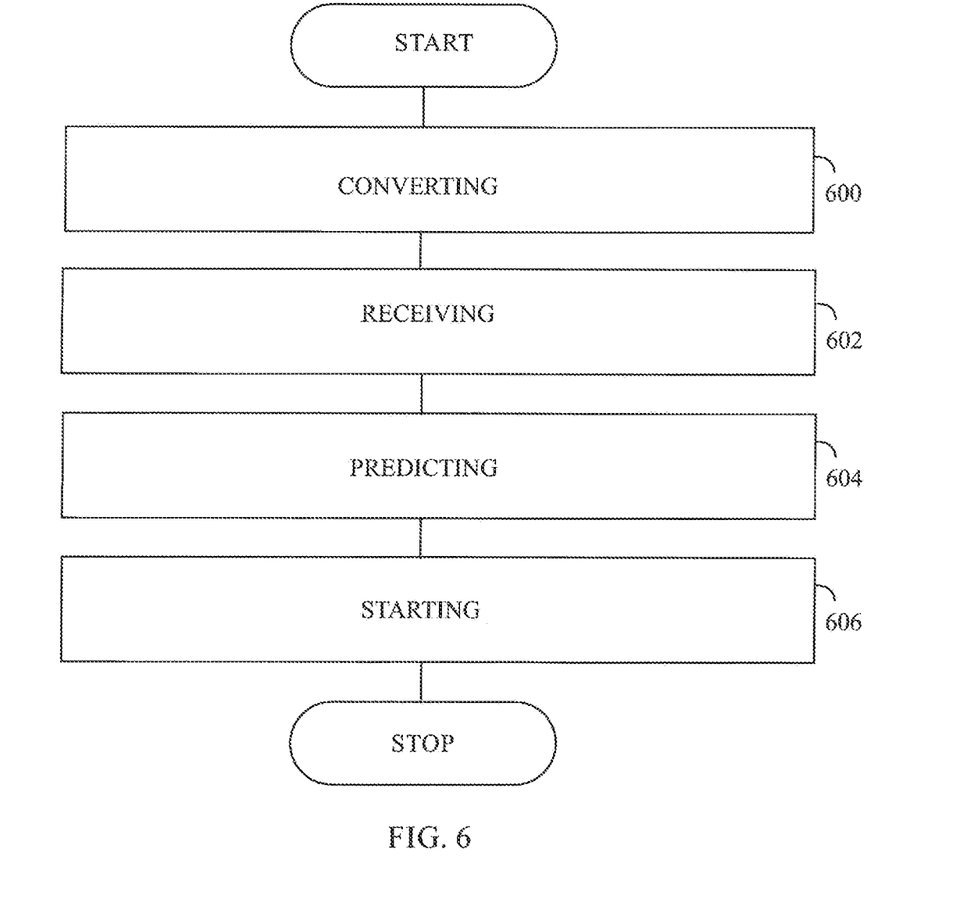
FIG. 6 illustrates of an example of a flow chart of a monitoring method.

FIG. 6 is a flow chart of the monitoring method. In step 600, mechanical vibration of the doctor blade arrangement 10, 10' is converted to an electrical signal with at least one vibration sensor 100A, 100A', 100B, 100B', each of which may be individual and is attached at a location of the doctor blade arrangement 10, 10', the mechanical vibration being caused by the doctor blade 102, 102' in response to a scraping operation of a rotating roll 104 which is in contact with a moving web 120. The location may be discrete.

In step 602, the electrical signal carrying information on the vibration is received by a data processing unit 110.

In step 604, the data processing unit 110 compares said vibration with a reference of at least one previous measurement of a same grade of the web 120. In step 604, the data processing unit 110 starts one or more preventive actions in order to avoid a drop-through in the case said vibration exceeds at least one boundary of the reference.

In step 604, the data processing unit 110 may also predict a drop-through on the basis of the information if the information includes characteristic of the drop-though. In step 606, the data processing unit 110 may start one or more preventive actions in order to avoid the drop-through in response to the prediction of the drop-through.

The method shown in FIG. 6 may be implemented as a logic circuit solution or computer program. The computer program may be placed on a computer program distribution means for the distribution thereof. The computer program distribution means is readable by a data processing device, and it encodes the computer program commands, carries out the measurements and optionally controls the processes on the basis of the measurements.

The computer program may be distributed using a distribution medium which may be any medium readable by the controller. The medium may be a program storage medium, a memory, a software distribution package, or a compressed software package. In some cases, the distribution may be performed using at least one of the following: a near field communication signal, a short distance signal, and a telecommunications signal.

It will be obvious to a person skilled in the art that, as technology advances, the inventive concept can be implemented in various ways. The invention and its embodiments are not limited to the example embodiments described above but may vary within the scope of the claims.

What is claimed is:

1. A monitoring apparatus for a doctoring, wherein the monitoring apparatus comprises:
    at least one vibration sensor each of which is attached at a location of a doctor blade arrangement, the at least one vibration sensor being configured to convert a mechanical vibration of the doctor blade arrangement to an electrical signal, the mechanical vibration being caused by the doctor blade in response to a scraping operation of a rotating roll which is in contact with a moving web; and
    a data processing unit configured to:
        receive the electrical signal carrying information on the vibration;
        continuously and without stoppage of the rotating roll, compare said vibration with a reference of at least one previous measurement of a same grade of the web; and
        start one or more preventive actions in order to avoid a drop-through in the case said vibration exceeds at least one boundary of the reference.

2. The monitoring apparatus of claim 1, wherein the vibration includes a running average of vibration of the same grade of the web within a period prior to a present measurement.

3. The monitoring apparatus of claim 1, wherein the monitoring apparatus comprises a support of the doctor blade as a part of the doctor blade arrangement, and the support comprises at least one of the at least one vibration sensor.

4. The monitoring apparatus of claim 1, wherein a vibration sensor of the at least one vibration sensor comprises a pressure sensor, which is configured to measure pressure vibrations of a pressure cylinder configured to adjust a contact force of the doctor blade against the roll.

5. The monitoring apparatus of claim 1, wherein the data processing unit is configured to determine at least one of the following parameters: a frequency of the vibration, a frequency variation of the vibration, a frequency shift of the vibration, an effective value of the vibration, and one or more peak values of the vibration;
    the data processing unit is configured to detect a deviation of any one of said parameters from the reference; and
    the data processing unit is configured to start the one or more preventive actions in response to the detection of the deviation.

6. The monitoring apparatus of claim 1, wherein one of the at least one vibration sensor is located at at least one of the following locations: a tending side of the doctor blade arrangement, and a drive side of the doctor blade arrangement.

7. The monitoring apparatus of claim 1, wherein the data processing unit is configured to disable a feed of the web to the rotating roll in response to the prediction of the drop-through.

8. The monitoring apparatus of claim 4, wherein the data processing unit is configured to adapt at least one boundary of the reference on the basis of a plurality of occurred drop-throughs.

9. The monitoring apparatus of claim 8, wherein the data processing unit is configured store the data on the plurality of drop-throughs for adapting the reference.

10. The monitoring apparatus of claim 1, wherein the data processing unit is configured to perform the monitoring starting at a beginning of a feed of a front end of the web to the rotating roll.

11. The monitoring apparatus of claim 10, wherein the data processing unit is configured to perform the monitoring in a time window a duration of which starts at the beginning of the feed of the front end of the web to the rotating roll, and the data processing unit is configured to end the monitoring at a moment of stabilization of the vibration, the data processing unit being configured to determine the stabilization from the electrical signal carrying information on the vibration.

12. The monitoring apparatus of claim 10, wherein the data processing unit is configured to perform the monitoring in a time window a duration of which is less than about 15 min.

13. The monitoring apparatus of claim 1, wherein the data processing unit is configured to determine that a doctor blade is worn and needs to be replaced on the basis of the information on the vibration if the information includes characteristics of a worn doctor blade.

14. The monitoring apparatus of claim 1, wherein
    data processing unit comprises one or more processors; and
    one or more memories including computer program code;
    the one or more memories and the computer program code being configured to, with the one or more processors, cause data processing unit at least to: receive the electrical signal, receive the electrical signal carrying information on the vibration, compare said vibration with a reference of at least one previous measurement of a same grade of the web, and start one or more preventive actions in order to avoid a drop-through in the case said vibration exceeds at least one boundary of the reference.

15. A monitoring method of doctoring, the method comprising:
    converting mechanical vibration of a doctor blade arrangement to an electrical signal with at least one vibration sensor each of which is attached at a location of the doctor blade arrangement, the mechanical vibration being caused by the doctor blade in response to a scraping operation of a rotating roll which is in contact with a moving web;

receiving, by a data processing unit, the electrical signal carrying information on the vibration;

continuously and without stoppage of the rotating roll, comparing said vibration with a reference of at least one previous measurement of a same grade of the web; and starting one or more preventive actions in order to avoid a drop-through in the case said vibration exceeds at least one boundary of the reference.

16. The monitoring apparatus of claim 1, wherein the mechanical vibration converted to the electrical signal indicates a state of the doctor blade before the drop-through of the doctor blade, and the data processing unit starts the one or more preventive actions in order to avoid the drop-through of the doctor blade.

* * * * *